United Stat X5201E
Miya et al.

[11] 3,818,345
[45] June 18, 1974

[54] LOW FREQUENCY SIGNAL TRANSMISSION AND INDICATING SYSTEM

[75] Inventors: Masami Miya, Tokyo; Hidetoshi Yarita, Kawasaki; Hirotaka Atsuzaka, Omiya, all of Japan

[73] Assignee: Nepon Kabushiki Kaisha, Tokyo-to, Japan

[22] Filed: Dec. 29, 1972

[21] Appl. No.: 319,827

[52] U.S. Cl. .......... 325/53, 325/29, 325/64, 325/111, 325/301, 325/430
[51] Int. Cl. .......... H04b 1/00, H04b 7/00
[58] Field of Search .......... 325/29, 31, 51, 53, 54, 325/55, 64, 111, 301, 305, 430; 340/311, 312, 147 C, 147 CV, 147 CN, 152 T; 343/200

[56] References Cited

UNITED STATES PATENTS

| | | | |
|---|---|---|---|
| 3,518,674 | 6/1970 | Moorehead et al. | 325/29 |
| 3,662,267 | 5/1972 | Reed | 325/51 |
| 3,739,329 | 6/1973 | Lester | 340/312 |

*Primary Examiner*—Robert L. Griffin
*Assistant Examiner*—Marc E. Bookbinder
*Attorney, Agent, or Firm*—Ladas, Parry, Von Gehr, Goldsmith & Deschamps

[57] ABSTRACT

Low frequency signals $f_l$ through $f_n$ are respectively assigned to respective portable radio transmitters and each transmitter transmits a wave modulated by this assigned low frequency signal. On the other hand, a set of a radio receiver, local receiver and a local transmitter is provided in each divided area to which one of low frequency signals $fL_1$ through $fL_n$ is assigned. A center transmitter selects a signal designating a portable radio transmitter to be detected and transmits this signal to the local receivers in these divided areas. When the object radio transmitter exists in one of these areas, the local transmitter in this area transmits the low frequency signal assigned to this area to a center receiver. The center receiver operates indication means corresponding to the signal from the local transmitter, i.e., the signal corresponding to the area, thereby detecting the area in which the object radio transmitter designated by the center transmitter is located.

5 Claims, 6 Drawing Figures

LOW FREQUENCY SIGNAL TRANSMISSION AND INDICATING SYSTEM

This invention relates to a low frequency signal transmission system and, more particularly, to a system adapted for detecting the location of a portable radio transmitter by transmission of a low frequency signal.

There has been known a system in which a specific frequency is assigned to each of portable rdio receivers and, when the specific frequency is transmitted by a control center radio frequency transmitter, the possessor of the radio receiver of this specific frequency becomes aware that he is detected by the control center radio transmitter by ringing of a buzzer or the like. According to this prior art system, however, a person on the control center transmitter side is unable to detect whether the particular portable receiver exists within a receiving area of the signal transmitted from the control center transmitter or the location of the portable receiver, although the possessor of the portable receiver can find the fact that he is detected.

Furthermore, the ringing of the buzzer is heard not only by the possessor of the portable receiver but by other persons who happen to be present nearby and this may sometimes cause an unpleasant feeling to the possessor.

This invention is designed to provide a system according to which the prior art portable radio receiver is replaced by a portable radio transmitter and a person on the control center transmitter side can detect the location of the portable radio transmitter without being known by the possessor of the portable transmitter and thereafter communicate with the possessor through a person or by telephone, thereby removing the likelihood of causing unpleasantness to the possessor.

It is therefore an object of the invention to provide a low frequency signal transmission and indication apparatus which is capable of detecting the location of a specific radio transmitter at a place remote therefrom.

It is another object of the invention to provide a highly reliable low frequency signal transmission and indication apparatus which is free from beat or cross modulation even in a case wherein a plurality of radio transmitters are used.

Briefly stated, according to the system of the invention, an area in which the location of a specific portable radio transmitter is to be detected is divided into one or more areas and a set of a radio receiver, a local receiver and a local transmitter is provided in each area. A specific low frequency signal is assigned to each portable radio transmitter and another specific low frequency signal is assigned to each area within which the location of the portable radio transmitter is to be detected. Control center transmitter and receiver are provided at a control center and a signal designating the portable radio transmitter to be detected is transmitted from the center transmitter to each local receiver. A local transmitter within an area in which the object portable radio transmitter exists transmits a specific signal assigned to the area to the center receiver. Thereupon the center receiver activates an indication circuit corresponding to the specific signal, whereby the location of the portable radio transmitter is detected.

Other objects and features of the invention will become apparent from the description made hereinbelow with reference to the accompanying drawings in which.

Figure 1:
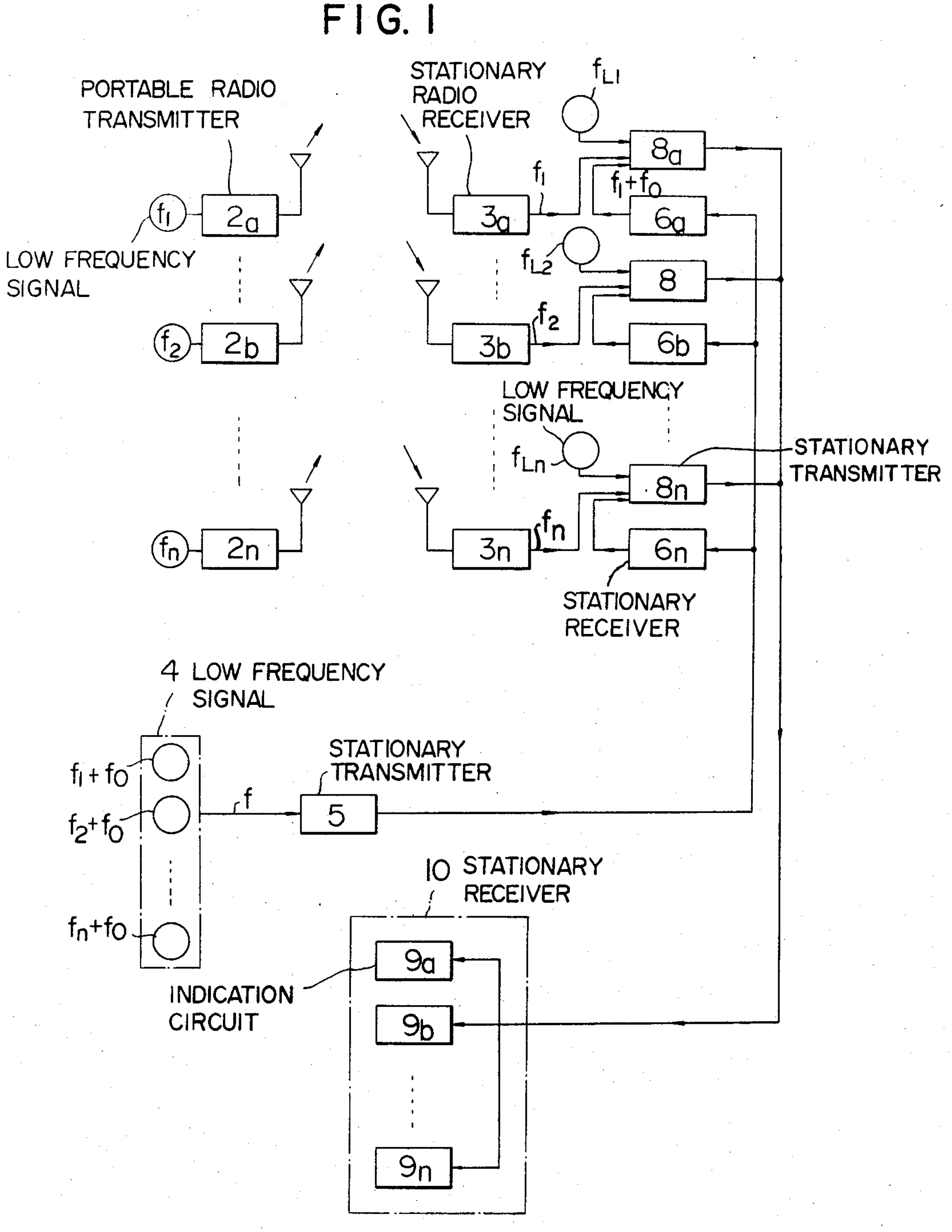
FIG. 1 is a block diagram showing the construction and signal transmission system of the low frequency signal transmission and indication system according to invention.

The system according to the invention comprises, as shown in FIG. 1, one or more portable radio transmitters 2*a* through 2*n* each one of which intermittently transmits a modulated wave having the same carrier as another and obtained by modulating this carrier by one of low frequency signal $f_l$ through $f_n$ (hereinafter represented by $f$) which are assigned to respective transmitters and differs from each other, one or more stationary radio receivers 3*a* through 3*n* each one of which receives this modulated wave and takes out the low frequency signal, a part 4 which selects one low frequency signal from among low frequency signals $f_l \pm f_O \ldots f_n \pm f_O$, (hereinafter represented by F) which are different from the low frequency signal by a predetermined frequency $f_O$, one or more stationary center transmitters 5 each one of which transmits a modulated wave having the same carrier as another and obtained by modulating this carrier by this selected signal, one or more stationary local receivers 6 *a* to 6*n* each one of which receives this modulated wave and takes out the low frequency signal F, one or more stationary local transmitters 8*a* to 8*n* each one of which takes out a difference frequency between the low frequency signal $f$ obtained from the radio receiver 3 and the low frequency signal F obtained from the stationary local receiver 6 and operate only when the difference frequency is the predetermined frequency $f_O$ to transmit a modulated wave having the same carrier as another and obtained by modulating this carrier by one of low frequency signals $f_{Ll}$ through $f_{Ln}$, (hereinafter represented by $f_L$) which differ from each other, and a stationary center receiver 10 which takes out the low frequency signal $f_L$ from this modulated signal and operates one of indication circuits 9*a* through 9*n* corresponding to the low frequency signal $f_L$.

Figure 2:
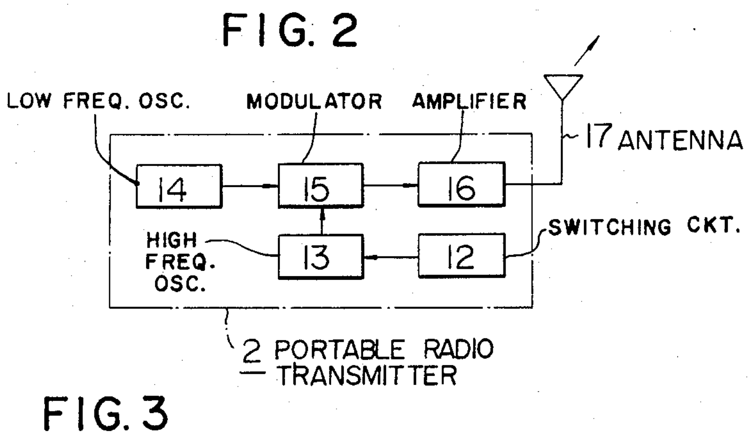
FIGS. 2 through 5 are block diagrams showing the construction and signal transmission system of each component part of one embodiment of the low frequency signal transmission and indication system according to the invention.

Referring to FIG. 2, a high frequency oscillator 13 included in the portable radio transmitter is controlled by a switching circuit 12 to generate a carrier signal intermittently. The carrier signal is modulated in a modulator 15 by an output of the low frequency oscillator 14. The modulated wave is amplified in a high frequency amplifier 16 and thereafter is transmitted from an antenna 17. Thus, the portable radio transmitter 2 intermittently transmits the modulated wave. In case there are a plurality of such portable radio transmitters, they are all of the same construction save that the low frequency signal $f$ generated from the low frequency oscillator 14 differs from one another.

Figure 3:
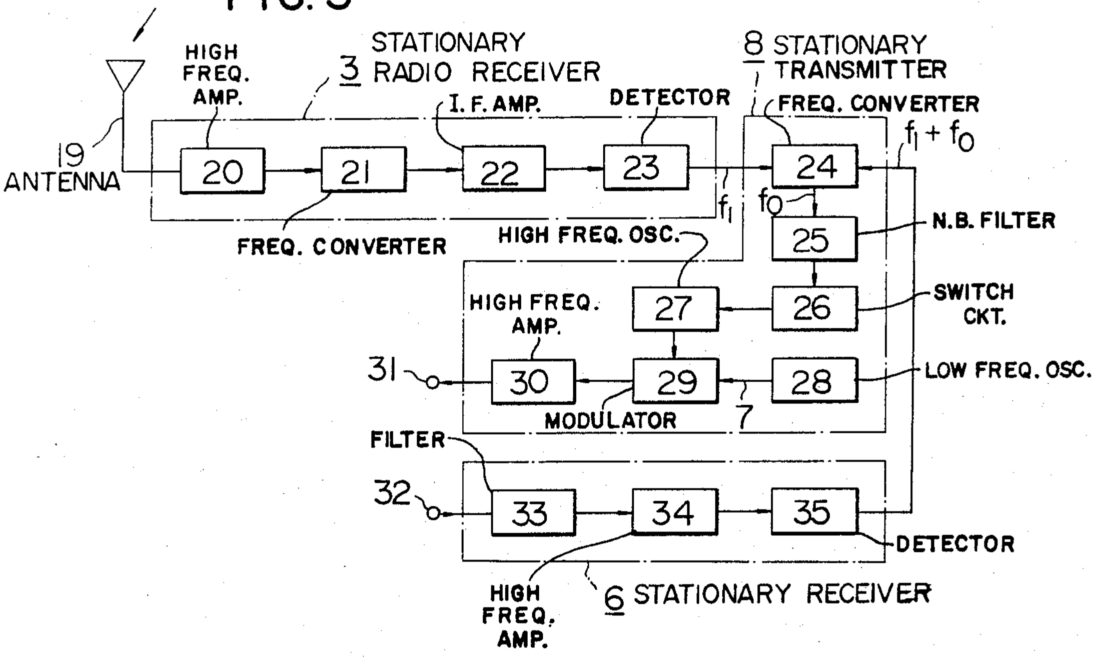

Referring to FIG. 3, assume that an antenna 19 receives the modulated wave from the portable radio transmitter 2*a*. The modulated wave received by the antenna 19 is amplified in a high frequency amplifier 20 and converted to an intermediate frequency signal in a frequency converter 21 and the converted signal is amplified by an intermediate frequency amplifier 22. The signal is thereafter is detected in an detection circuit 23. The low frequency signal $f_l$ detected in the detection circuit 23 is applied to a frequency converter 24.

Figure 4:
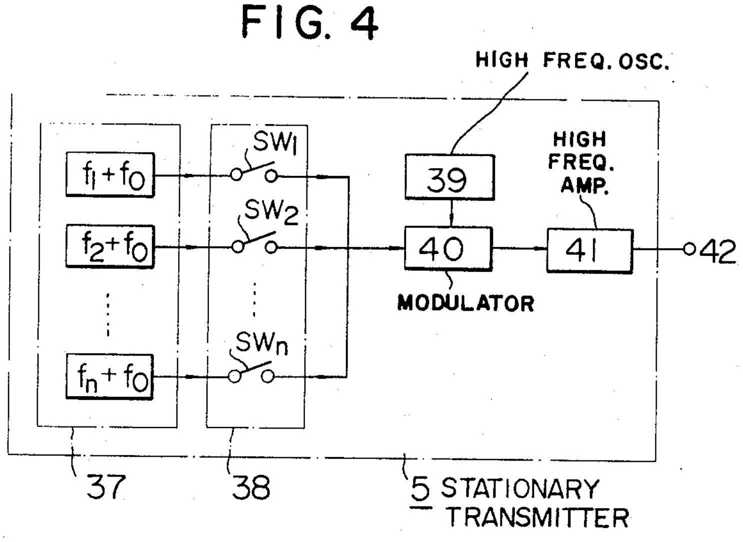

Referring to FIG. 4, a low frequency signal oscillator 37 in the part 4 is capable of generating a plurality of different low frequency signals F. Assume that a low frequency signal $f_l+f_O$ is selected by means of switches 38 including switches $SW_l$ through $SW_n$. A carrier signal applied from a high frequency oscillator 39 is modulated in a modulator 40 by the selected low frequency signal $f_l+f_O$. The modulated wave is amplified in a high frequency amplifier 41 and transmitted from an output terminal 42. The stationary transmitter 5 comprises the above described components and transmits the modulated wave only when at least one of the switches 38 is closed. The high frequency oscillator 39 may be energized and de-energized in association with the switches 38. If there are a plurality of the stationary transmitters 5, they are all of the same construction.

Referring again to FIG. 3, the modulated wave transmitted from the terminal 42 (FIG. 4) is applied to an input terminal 32. The modulated wave passes through a filter circuit 33 and is amplified in a high frequency amplifier 34 and thereafter is detected in a detection circuit 35. The low frequency signal $f_l+f_O$ detected in the detection circuit 35 is applied to the frequency converter 24. A difference frequency between this low frequency signal and the low frequency signal $f_l$ applied from the radio receiver 3 is taken out in the frequency converter 24 and applied to a narrow-band filter 25 which passes only the frequency $f_O$. Accordingly, the signal $f_O$ actuates a switching circuit 26 to oscillate a carrier signal from a high frequency oscillator 27. The carrier signal is modulated in a modulated 29 by a low frequency signal $f_U$ from a low frequency oscilator 28. The modulated wave from the modulator 29 is amplified in a high frequency amplifier 30 and therafter is transmitted from an output terminal 31. The stationary receivers 3 and 6 and the stationary transmitter 8 have the above described constructions. If there are a plurality of the respective component, they are of the same construction except that the low frequency oscillators 28 oscillate low frequency signals which differ one from the other.

Figure 5:
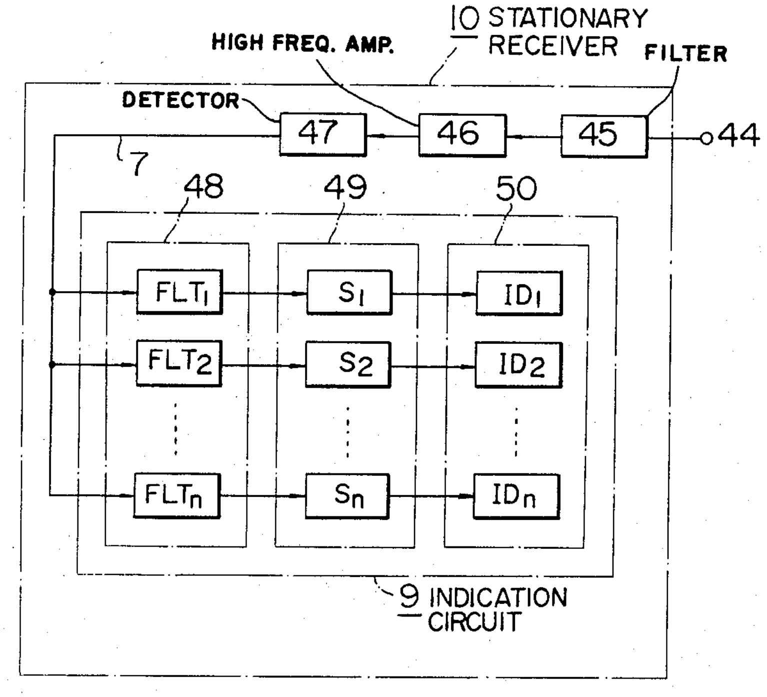

In FIG. 5, the modulated wave applied to an input terminal 44 from the terminal 31 (FIG. 3) passes a filter circuit 45. This modulated wave is amplified in a high frequency amplifier 46 and thereafter is detected in a detection circuit 47. The output of the detection circuit 47 is connected to a filter circuit 48 having narrow-band filters $FLT_l$ to $FLT_n$. The output of the filter circuit is connected to an indication circuit 50 having indicators $ID_l$ to $ID_n$ via a switching circuit 49 consisting of switches $S_l$ to $S_n$. The low frequency signal $f_U$ detected in the detection circuit 47 passes one of the narrow-band filters $FLT_l$ and actuates a switch $S_l$ corresponding to the narrow-band filter which the low frequency signal $f_U$ has passed. Thereupon an indicator $ID_l$ is actuated.

Figure 6:
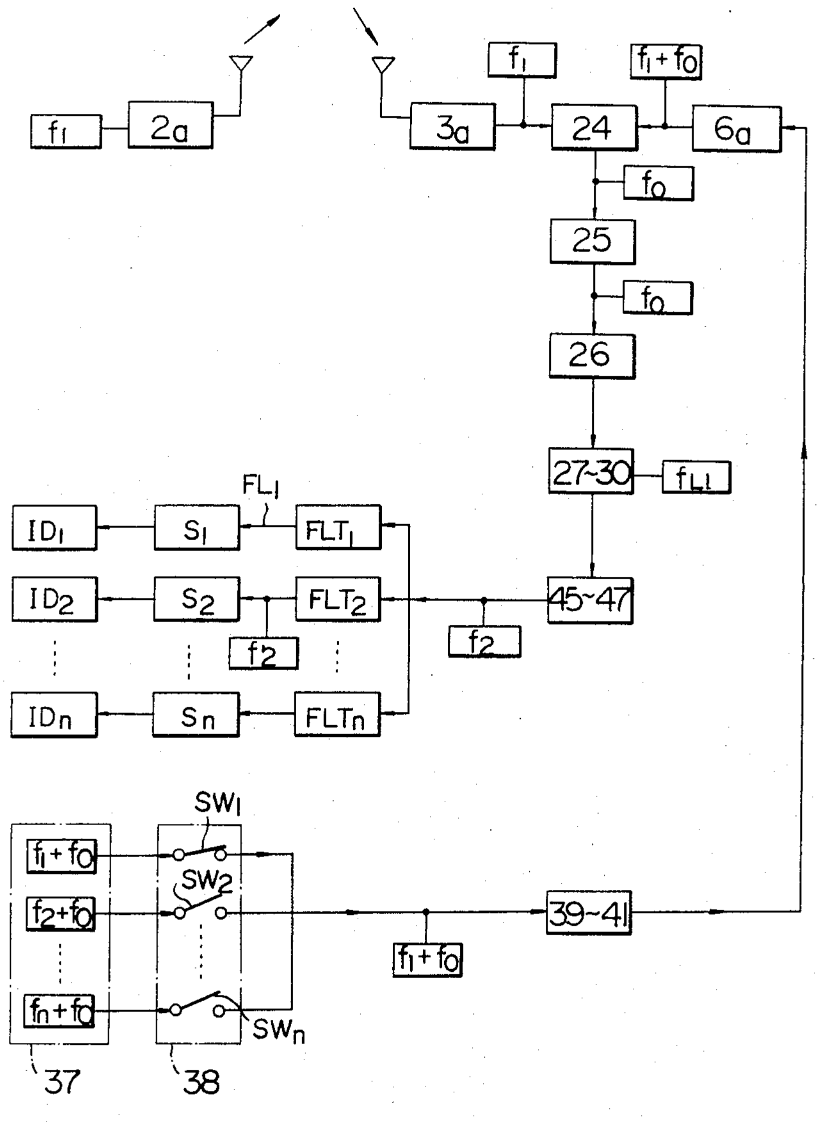
FIG. 6 is a block diagram showing relations between the low frequency signals in the respective component parts of the system.

FIG. 6 shows relations between the frequencies of the low frequency signals in the respective transmitters and receivers as well as the system of signal transmission. It will be understood from the figure that the low frequency signal transmitted from the stationary transmitter 5 (FIG. 1) is $f_l+f_O$, whereas the low frequency signal transmitted from the portable radio transmitter 2*a* is $f_l$. The frequency passing the narrow-band filter 25 of the stationary transmitter 8*a* (FIG. 1) is $f_O$ and the low frequency signal transmitted therefrom is represented as $f_U$. In the stationary center receiver 10 (FIG. 1), the indicator 50 (FIG. 1) receives the low frequency signal $f_U$ from the narrow-band filter 48 (FIG. 5).

In the foregoing embodiment, the explanation has been made about the case in which the portable radio transmitter 2*a* is within a receiving range of the radio receiver 3*a*. It will be appreciated that the location of any portable radio transmitter can be detected if that transmitter enters a receiving range of either one of the radio receivers. Further, the transmitters 5 (FIG. 4) and 10 (FIG. 5) need not necessarily be fixed to specific places but they may include movable ones.

What we claim is:

1. A low frequency signal transmission and indication system comprising one or more portable radio transmitters each transmitting a modulated wave signal having the same carrier and obtained by modulating this carrier by a respectively different low frequency signal which is assigned to each transmitter, one or more radio receivers each removing said low frequency signal from said modulated wave when it receives said modulated wave, one or more control center transmitters each transmitting a modulated wave signal having the same carrier and obtained by modulating this carrier by one of a plurality of signals which respectively differ from said low frequency signals assigned to each transmitter by a constant frequency $f_O$, one or more receivers assigned to respective geographical areas removing the low frequency signal from said modulated wave signal transmitted from said center transmitter, means for detecting the difference between the low frequency signal from said radio receiver and the low frequency signal from said geographically assigned receiver, one or more transmitters assigned to respective geographical areas each transmitting a modulated wave signal having the same carrier and obtained by modulating said carrier by another respectively different low frequency signal only when said detected difference in frequency is identical with the constant frequency $f_O$, and a control center receiver receiving the signal from said geographically assigned transmitter, removing the low frequency signal contained in this signal and activating an indication circuit corresponding to this low frequency signal, whereby, when a carrier modulated by a selected specific low frequency signal is transmitted from said center transmitter, only a geographically assigned transmitter connected to a radio receiver which has received from one of said portable radio transmitters a wave modulated by the low frequency signal which is different from this selected specific low frequency signal by the frequency $f_O$ is activated to inform that this particular portable radio transmitter is in the vicinity of said particular geographically assigned receiver.

2. A low frequency signal transmission and indication system as defined in claim 1 in which said portable radio transmitter is of a type which intermittently transmits the modulated wave.

3. A low frequency signal transmission and indication system as defined in claim 1 in which said portable radio transmitter comprises an oscillation circuit for oscillating the assigned low frequency, a high frequency oscillation circuit for oscillating the carrier, a switching circuit for intermittently actuating said oscillator and modulation circuit for modulating said carrier by said assigned low frequency.

4. A low frequency signal transmission and indication system as defined in claim 1 in which said geographically assigned transmitter comprises a frequency conversion circuit receiving the signal from the local receiver and the signal from the radio receiver and producing a signal which represents difference between the two signals, a narrow-band filter for filtering only the frequency $f_0$ from the signal of said frequency conversion circuit, a switching circuit for activating said high frequency oscillation circuit upon receipt of the output of said filter and means for modulating the carrier output from said high frequency oscillation circuit by a low frequency signal.

5. A low frequency signal transmission and indication system as defined in claim 1 in which said center receiver comprises a detection circuit which detects the input signals, one or more filters which respectively filter the output of the detection circuit, said indication circuit including indicators coupled to each filter.

* * * * *